(12) United States Patent
Sasaki et al.

(10) Patent No.: US 7,556,449 B2
(45) Date of Patent: Jul. 7, 2009

(54) CLIP FOR ATTACHING STRIP MEMBER

(75) Inventors: Noriyoshi Sasaki, Worthington, OH (US); Seiichi Yuda, Utsunomiya (JP); Norimichi Tamura, Wako (JP)

(73) Assignees: Nifco Inc., Yokohama (JP); Honda Giken Kogyo Kabushiki Kaisha, Tokyo (JP)

( * ) Notice: Subject to any disclaimer, the term of this patent is extended or adjusted under 35 U.S.C. 154(b) by 1051 days.

(21) Appl. No.: 10/644,973

(22) Filed: Aug. 21, 2003

(65) Prior Publication Data

US 2004/0067100 A1   Apr. 8, 2004

(30) Foreign Application Priority Data

Oct. 4, 2002   (JP) ............... 2002-292684

(51) Int. Cl.
   *F16D 1/00*   (2006.01)
(52) U.S. Cl. ............... 403/322.4; 403/321; 403/322.1
(58) Field of Classification Search ............... 403/83, 403/84, 92, 95, 205, 315, 316, 320, 402; 292/101, 102, 213, 214, 218, 228, 202, 203, 292/304; 24/289–297; 296/216, 219, 223; 160/118, 188; 52/716.1–717.02, 717.03
See application file for complete search history.

(56) References Cited

U.S. PATENT DOCUMENTS

| | | | |
|---|---|---|---|
| 3,634,991 A | | 1/1972 | Barton, Jr. et al. |
| 4,229,844 A | * | 10/1980 | Cribben et al. ............ 52/716.2 |
| 4,530,195 A | * | 7/1985 | Leopold ................ 52/717.02 |
| 4,794,663 A | * | 1/1989 | Vosbikian ................ 15/229.6 |
| 4,822,205 A | * | 4/1989 | Berdan ................ 403/402 |
| 4,942,271 A | * | 7/1990 | Corsi et al. .............. 174/101 |
| 5,154,531 A | * | 10/1992 | Peterson ................ 403/205 |
| 5,184,794 A | * | 2/1993 | Saito ................ 248/68.1 |
| 5,568,906 A | * | 10/1996 | Hahn et al. ............ 248/74.1 |
| 6,056,572 A | * | 5/2000 | Matsumoto et al. ....... 439/260 |
| 6,485,317 B2 | * | 11/2002 | Gundermann et al. ...... 439/157 |
| 6,667,002 B1 | * | 12/2003 | Meyer ................ 264/138 |
| 6,736,655 B2 | * | 5/2004 | Martin et al. ............ 439/157 |

FOREIGN PATENT DOCUMENTS

| | | |
|---|---|---|
| EP | 1 211 115 | 6/2002 |
| FR | 2 800 024 | 4/2001 |
| GB | 2 040 350 | 8/1980 |
| JP | 2001-30852 | 2/2001 |

OTHER PUBLICATIONS

Patent Abstracts of Japan, Publication No. 2001030852, Publication Date: Feb. 6, 2001, Applicant: Togo Seisakusho Corp.; Title: Clip for roof Molding.

* cited by examiner

*Primary Examiner*—Robert J Sandy
*Assistant Examiner*—Ruth C Rodriguez
(74) *Attorney, Agent, or Firm*—Manabu Kanesaka

(57) ABSTRACT

A clip attaches a strip member to at least a part of an opening of a groove formed on a panel. The clip for attaching a strip member includes a first portion or car body side joining portion to be attached to a bottom surface of the groove, and a second portion or strip side joining portion to be attached to the strip member. The second portion is connected to the first portion rotatably around an axis line along a groove extending direction. Further, an upright-state holding device is provided between the first and second portions.

9 Claims, 5 Drawing Sheets

CLIP FOR ATTACHING STRIP MEMBER

BACKGROUND OF THE INVENTION AND RELATED ART STATEMENT

The invention relates to a clip for attaching a weatherstrip to an opening of a groove formed on a panel.

As a roof structure of an automobile, Japanese Patent Publication (KOKAI) No. 11-105638 has disclosed a structure having a center portion in a width direction of the automobile and separate side portions connected to the center portion by welding. In the roof, a strip or cover member is attached to an opening of a groove formed at the welded portions in the front and rear directions of the automobile to cover the welded portions.

It is necessary to attach the strip member easily and securely to the car body without a risk of detaching from the car body due to aging. The above-mentioned patent publication has disclosed a clip made of an elastic material and bonded to the bottom surface of the groove in advance. The strip member is pressed against the clip to elastically engage the clip.

However, according to the conventional technique described above, it is difficult to obtain a sufficient margin for bending the clip when the strip member is attached. Also, it is difficult to provide a sufficient strength for fixing the strip member to the clip when the clip is restored. When the clip is made to be easily attached to the strip member, the fixing strength is decreased. When the fixing strength is increased, it is difficult to attach the strip member to the clip.

In view of the above problems, the present invention has been made and an object of the invention is to provide a clip for attaching a strip member, wherein it is easy to attach the strip member as well as the strip member can be fixed to the clip with a high strength.

Further objects and advantages of the invention will be apparent from the following description of the invention.

SUMMARY OF THE INVENTION

In order to attain the objects, according to the first aspect of the invention, a clip for attaching a strip member attaches a strip member to at least a part of an opening of a groove formed on a panel. The clip for attaching a strip member including a first portion (car body side joining portion) to be attached to a bottom surface of the groove and a second portion (strip side joining portion) to be attached to the strip member. The second portion is connected to the first portion rotatably around an axis line along a groove extending direction. Further, an upright-state holding device is provided between the first and second portions.

With the structure stated above, the strip side joining portion is rotated with respect to the car body side joining portion, and these portions can be held in an upright state. Therefore, when the clip is fixed to the bottom surface of the groove in advance, the strip member can be easily attached to the clip with a large bending margin.

According to the second aspect of the invention, the upright-state holding device is obtained from a frictional resistance between a shaft having a non-circular cross section orthogonal to a rotary axis line and a shaft receiving hole. Therefore, it is possible to prevent wobbling around a rotational center.

According to the third aspect of the invention, an engagement device having a ratchet function is provided around a rotational center shaft of the first portion and the second portion. Therefore, it is possible to provide a restriction when engaged, so that an operator can easily recognize when the assembling is completed.

DETAILED DESCRIPTION OF PREFERRED EMBODIMENT

Figure 1:
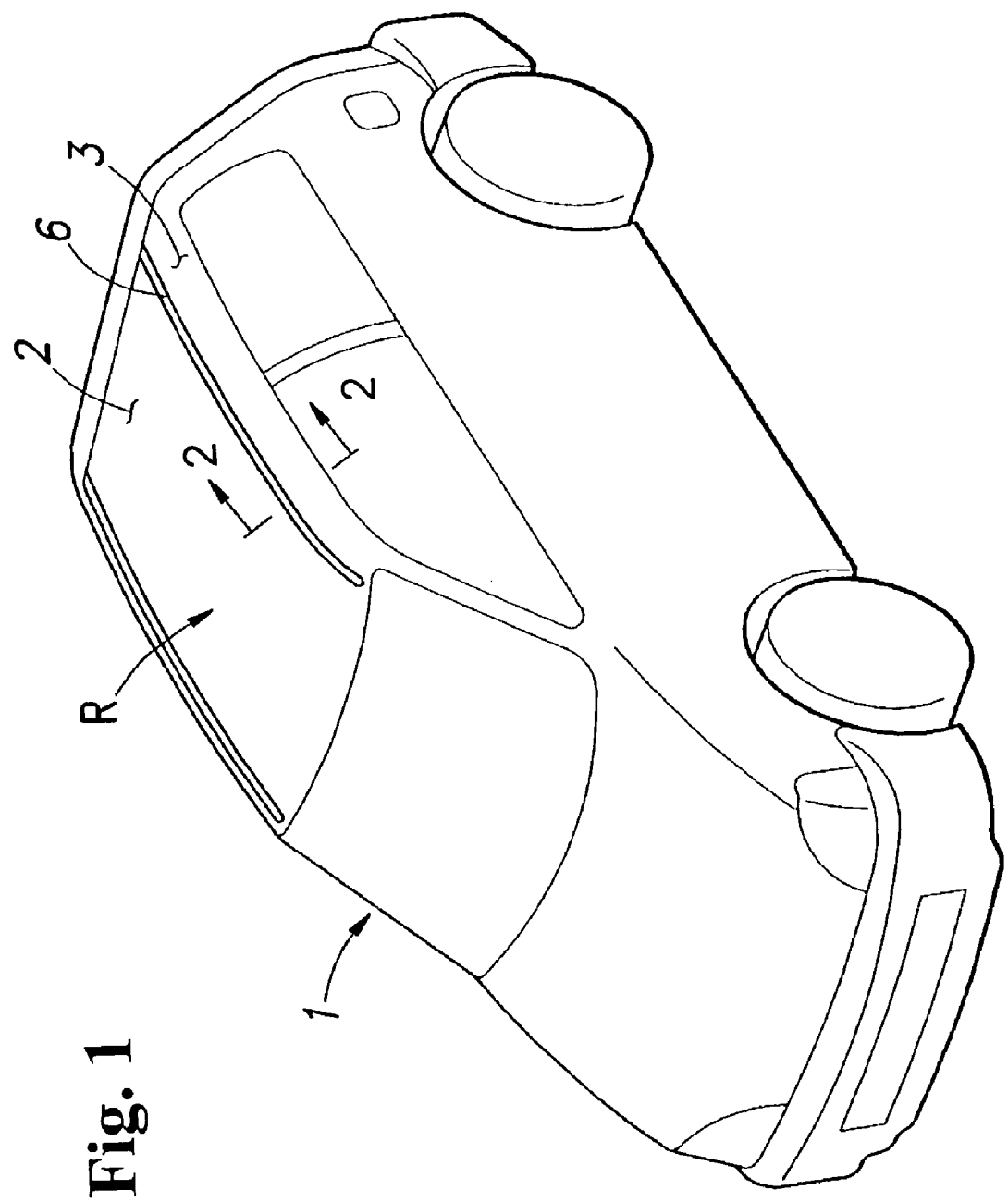
FIG. 1 is a perspective view of an entire automobile to which the present invention is applied.
Figure 2:
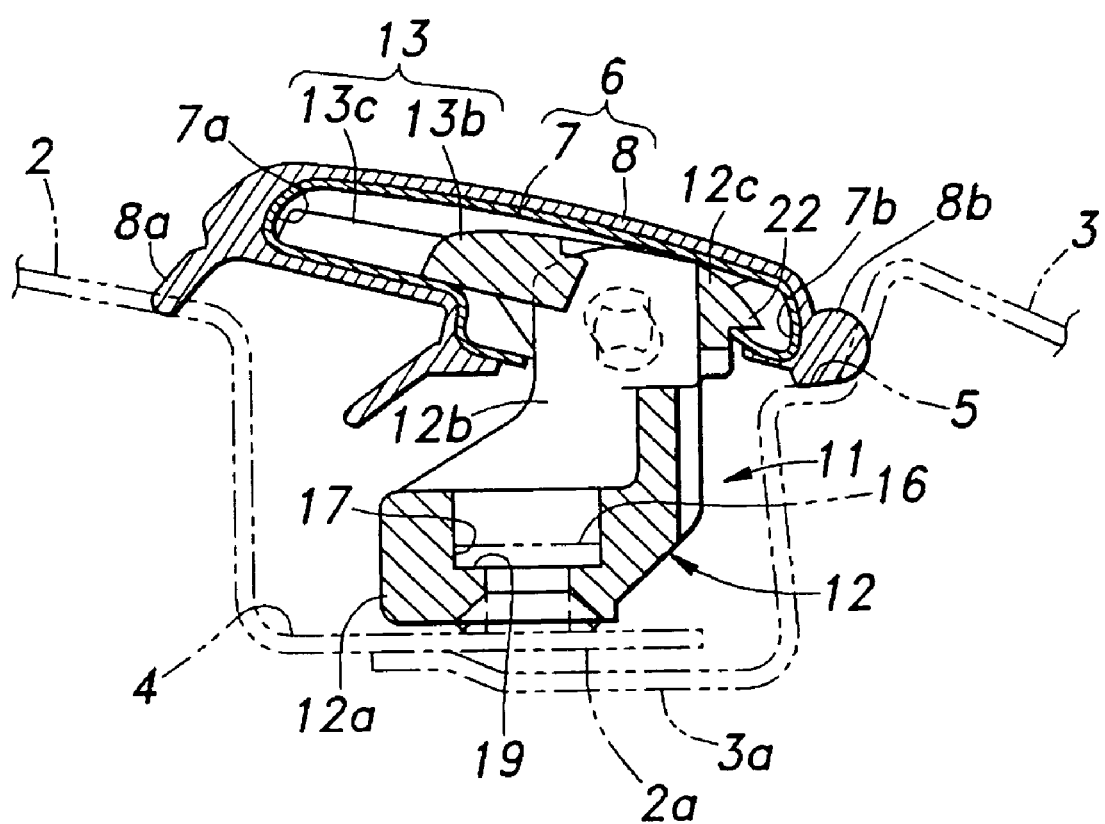
FIG. 2 is a sectional view showing an essential part taken along line 2-2 in FIG. 1.
Figure 3:
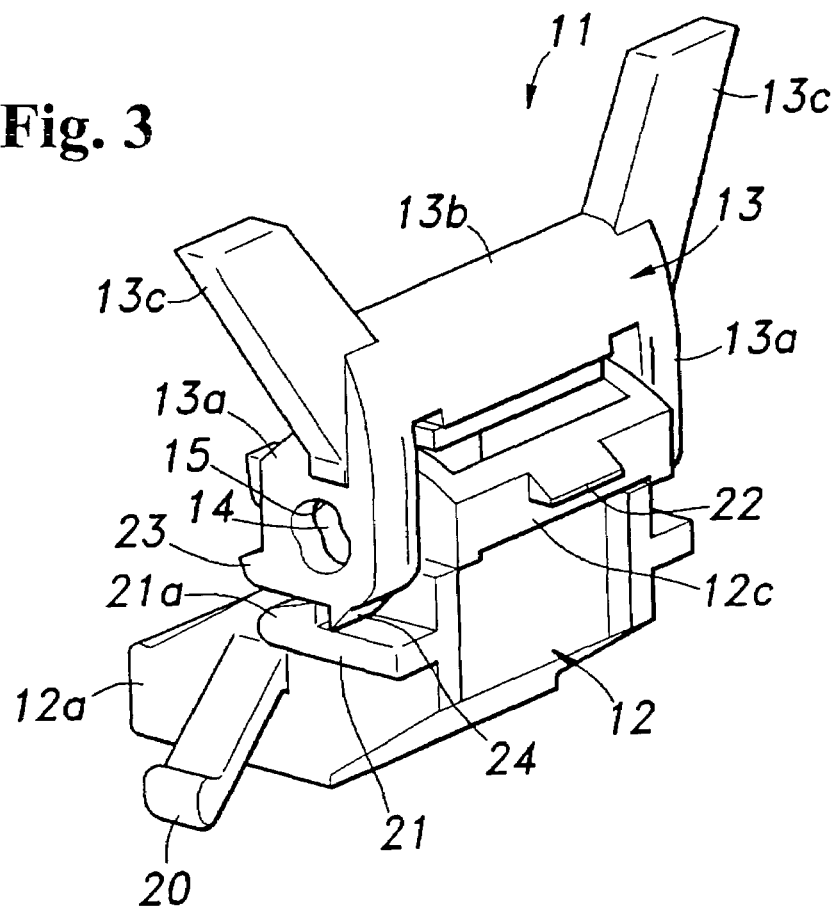
FIG. 3 is a perspective view of an entire clip according to the present invention.
Figure 4:
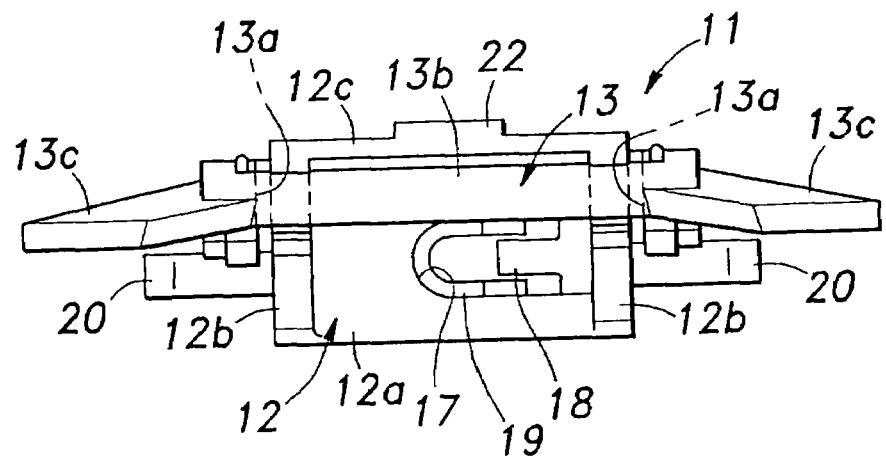
FIG. 4 is a top view of the clip.
Figure 5:
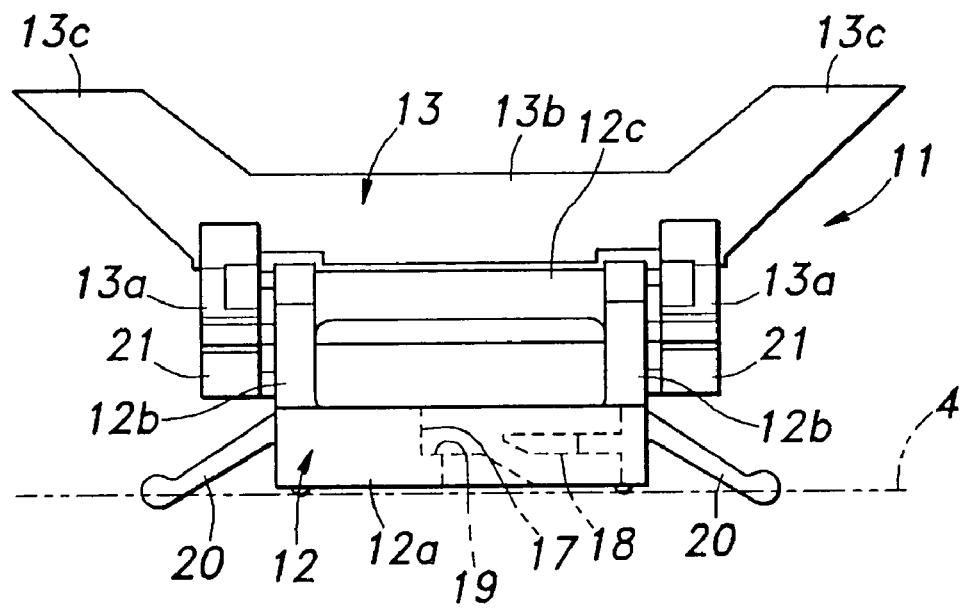
FIG. 5 is a side view of the clip.
Figure 6:
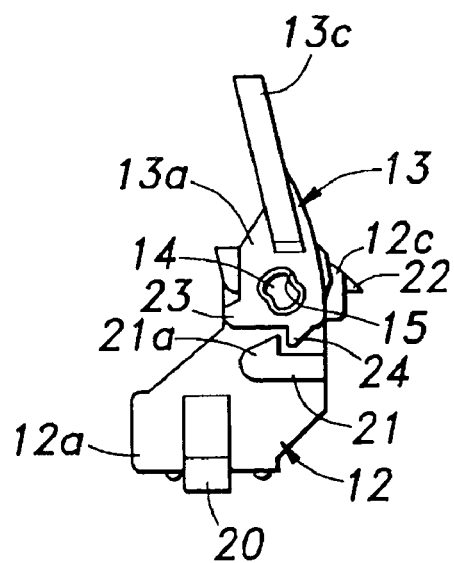
FIG. 6 is a front view of the clip.

Hereunder, the present invention will be described in detail with reference to the accompanying drawings. FIG. 1 is a perspective view showing an entire body of an automobile to which the present invention is applied. A roof R of a car body 1 includes a main roof panel 2 covering a large part of the roof R at the central portion in the horizontal direction, and side roof panels 3 adjacent to window frames at both sides of the main roof panel 2. The both roof panels 2, 3 shown by phantom lines in FIG. 2 are integrally connected by overlapping and welding edge portions 2a, 3a of the roof panels 2, 3 extending in the front-to-rear direction. A groove 4 with an open upper surface extends in the front-to-rear direction at joining portions of the roof panels 2, 3. Incidentally, a direction in the present specification is expressed relative to the car body for convenience.

The groove 4 has a U-character shape section, and a shallow step 5 is formed on one side edge (on the side of the side roof panel 3) of the open surface. One side of a strip member 6 coated with a synthetic resin abuts against the step 5, and the other side thereof abuts against an upper surface of the main roof panel 2, so that the joining portions of the roof panels 2, 3 are covered with the strip member 6, thereby obtaining a good appearance.

The strip member 6 includes a core 7 having an approximately C shape cross section with a downward opening and a covering portion 8 formed of a relatively soft synthetic resin for covering an outer surface of the core 7. Sealing portions 8a, 8b are continuously formed at both side edges of the covering portion for elastically contacting the upper surfaces of the panels 2, 3 continued to the open surface of the groove 4, thereby preventing water from entering the groove 4.

Figure 7:
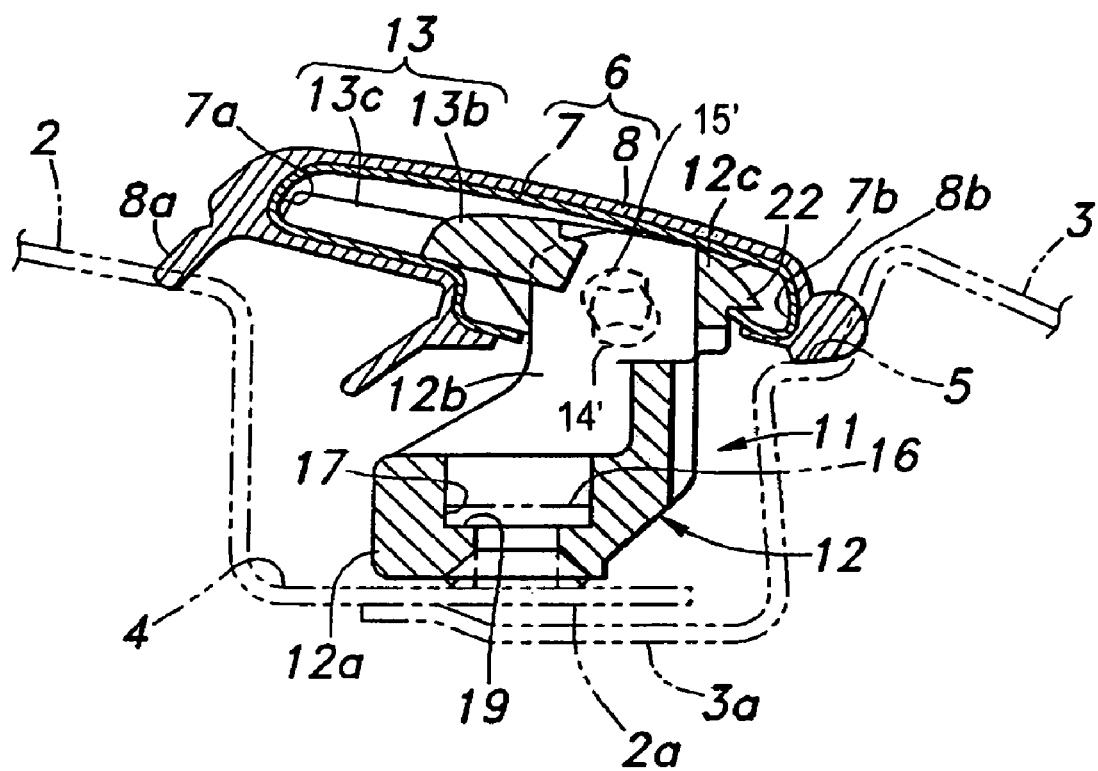
FIG. 7 is a sectional view for an embodiment different from FIG. 2 showing an essential part taken along line 2-2 in FIG. 1.

The strip member 6 is attached to the car body with the clip as described below. A clip 11 is formed of a hard synthetic resin material. As shown in FIGS. 3 to 6, the clip 11 includes a car body side joining portion (a first portion) 12 and a strip side joining portion (a second portion) 13. When shaft portions 14 projecting from both end surfaces of the car body side joining portion 12 in the front and rear directions are fitted in bearing holes 15 formed on the strip side joining portion 13, the car body side joining portion 12 and the strip side joining portion 13 are relatively rotatable by a predetermined angle. The shaft portion 14' may be provided at the strip side joining portion 13, and the bearing holes 15' may be formed in the joining portion 12, as shown in FIG. 7.

The car body side joining portion 12 includes a base portion 12a connected to a wide diameter head portion 16 of a T-stud uprightly welded on the bottom surface of the groove 4; stay portions 12b projecting upwardly at both front and rear end surfaces of the base portion 12a for supporting the strip side joining portion 13; and a bridge portion 12c for connecting upper surfaces of the front and rear stay portions 12b facing the side roof panel 3.

The base portion 12a has an approximately rectangular shape, and a vertically penetrating long hole 17 extends from an intermediate portion of the base portion 12a to the forward end thereof in the front and rear directions. An engaging member 18 having a cantilever beam shape is projected from an inner surface of a forward end side of the long hole 17 at an intermediate portion in the vertical direction, so that a free end portion thereof is bent in the vertical direction. An inward step portion 19 extending in the peripheral direction is formed at an intermediate portion of an inner peripheral wall in the height direction rearwards from an intermediate portion of the long hole 17 in the front-to-rear direction. Also, elastic members 20 extend diagonally downward from upper portions of the respective front and rear end surfaces of the base portion 12a.

Ratchet lever portions 21 having hook nails 21a at free ends thereof and the shaft portions 14 are vertically disposed side by side on the respective front and rear end surfaces of the stay portions 12b. A projection 22 having a triangular cross section is formed on an outer surface at an intermediate portion of the bridge portion 12c in the front and rear directions.

The strip side joining portion 13 includes shaft receiving holes 15 for receiving therein the shaft portions 14; a pair of front and rear shaft receiving plates 13a provided with ratchet claws 23 for engaging the hook nails 21a of the ratchet lever portions 21 and stopper projections 24; a connecting plate 13b for connecting the front and rear shaft receiving plates 13a; and a pair of angular projections 13c extending diagonally outwards from the respective connecting portions of the front and rear shaft receiving plates 13a and connecting plate 13b.

The core 7 of the strip member 6 has a flat C-character shape as a whole. A deep groove 7a is formed at a side of the core positioned at the center of the roof R, and a shallow groove 7b is formed at the opposite side thereof. When the strip member 6 is attached, the angular projections 13c of the strip side joining portion 13 are received in the deep groove 7a. An edge at the shallow groove 7b side hooks on a projection 22 of the outer surface of the bridge portion 12c of the car body side joining portion 12, so that the strip member 6 is attached to the clip 11.

When the clip 11 is attached to the bottom surface of the groove 4, a lower surface of an engaging member 18 projecting into the long hole 17 of the base portion 12a of the car body side joining portion 12 is pressed against the wide diameter head portion 16 of the T-stud. Then, the wide diameter head portion 16 is pushed in the long hole 17 while bending the free end of the engaging member 18 upwards. The clip 11 is slid forward (right direction in FIGS. 4 and 5) while allowing the lower surface of the wide diameter head portion 16 to abut against the upper surface of the step 19. Accordingly, the wide diameter head portion 16 of the T-stud engages the step 19 of the long hole 17. Also, the free end of the engaging member 18 returned by the elastic force of the material faces an outer peripheral surface of the wide diameter head portion 16 to thereby prevent the clip 11 from disengaging from the T-stud.

The pair of the elastic members 20 extending diagonally downwards from both front and rear end surfaces of the base portion 12a presses against the bottom surface of the groove 4. With the downward force, the base portion 12a is pushed upwards. This configuration enhances the force for fixing the wide diameter head portion 16 of the T-stud to the step 19 of the long hole 17.

In order to attach the strip member 6 to the clip 11 attached to the bottom surface of the groove 4 in advance as described above, as shown in FIGS. 3 through 6, first the strip side joining portion 13 is held in a standing state. While the pair of the angular projections 13c is covered with the deep groove 7a of the core 7, the strip side joining portion 13 is rotated in a falling-down direction so that one side sealing portion 8a is pressed against the upper surface of the main roof panel 2. Then, while bending the angular projections 13c as well as the bridge portion 12c of the car body side joining portion 12, the projection 22 on the outer surface of the bridge portion 12c is allowed to get over an edge of the shallow groove 7b of the core 7. The shallow groove 7b side is allowed to engage the projection 22, and the other side sealing portion 8b is allowed to abut against the step 5 of the groove 4. Thus, the completely joined state as shown in FIG. 2 is obtained.

A distance from the forward end of the angular projection 13c to the outer end of the projection 22 of the bridge portion 12c is set to be larger than an inner width dimension of the core 7 of the strip member 6, when the strip side joining portion 13 is fallen down without any outer force. Thus, when the strip member 6 is joined to the strip side joining portion 13, a strong binding force by the elastic restoring force of the angular projections 13c is applied on the core 7.

The shaft portion 14 and the shaft receiving hole 15 have a gourd shape narrowed at an intermediate portion. When both of them are held in an upright state, the outlines thereof are overlapped with each other. The stopper projection 24 faces the hook nail 21a of the ratchet lever portion 21. Therefore, when there is no outer force, the upright state is held, so that the workability of attaching the strip member 6 to the strip side joining portion 13 is improved.

When the strip side joining portion 13 is rotated in the falling-down direction, the narrowed portion of the shaft receiving hole 15 contacts the swelled portion of the shaft portion 14, thereby causing friction. The ratchet claw 23 pushes away the ratchet lever portion 21 to deform, so that the elastic force also acts as the rotational friction. In the state that the strip side joining portion 13 falls down completely, the ratchet lever portion 21 restores to the original state from the elastically deformed state by the ratchet claw 23 of the strip side joining portion 13 when the strip side joining portion 13 is rotated. The hook nail 21a of the free end engages the ratchet claw 23. At this time, there is no rotational friction by the ratchet lever portion 21, and the operator can easily recognize that the ratchet lever portion 21 reaches the complete position.

With the ratchet action between the ratchet lever portion 21 and the ratchet claw 23, the rotation of the strip side joining portion 13 in the upright direction is prevented. Also, under this state, the outside sealing portion 8b of the strip member 6 abuts against the step 5 of the groove 4. Thus, it is difficult to rotate the strip side joining portion 13 in the upright direction, thereby increasing the binding strength of the strip member 6.

As described above, according to the first aspect of the invention, when the strip member is attached to the clip, the strip side joining portion of the clip is held in the upright state. Therefore, the attaching ability of the strip member to the clip fixed in advance is greatly improved. Moreover, the bending margin of the clip can be set relatively large. Therefore, the binding strength of the strip member with respect to the clip can be increased greatly.

In addition to the above structure, according to the second aspect of the invention, the shaft and the shaft receiving hole are formed in the non-circular shape so that the strip side joining portion can be held in the upright state through the contact resistance. Therefore, it is possible to eliminate the wobbling around the rotational center.

In addition to the above structures, according to the third aspect of the invention, the ratchet mechanism is provided for locking the strip side joining portion with respect to the car body side joining portion, thereby creating the restriction when it stops. Therefore, the operator can easily and positively determine the assembling completion state. Moreover, the holding force can be easily adjusted through setting the height of the claw or the like.

While the invention has been explained with reference to the specific embodiments of the invention, the explanation is illustrative and the invention is limited only by the appended claims.

What is claimed is:

1. A clip for attaching a strip member to a groove, comprising:
   a first portion to be attached to the groove,
   a second portion to be attached to the strip member, said second portion being rotatably connected to the first portion around an axis line along the groove, and
   a holding device disposed between the first portion and the second portion for holding the second portion in an upright state relative to the first portion, said holding device including a shaft disposed on one of the first and second portions, and a shaft receiving hole disposed on the other of the first and second portions for receiving the shaft,
   wherein said first portion includes a first projection at one side thereof, and said second portion includes a second projection at one side thereof, said first and second projections engaging the strip member for holding the same.

2. A clip for attaching a strip member according to claim 1, wherein said shaft and shaft receiving hole have an elongated shape perpendicular to the axis line so that when the shaft and shaft receiving hole are simply engaged together without force, the second portion is held in the upright state 3. A clip for attaching a strip member according to claim 1, further comprising an engagement device with a ratchet function disposed between the first portion and the second portion for fixing the second portion relative to the first portion in an inclined state.

4. A clip for attaching a strip member according to claim 1, wherein said shaft and shaft receiving hole are formed on each end of the first and second portions in the axial line.

5. A clip for attaching a strip member to a groove, comprising:
   a first portion to be attached to the groove,
   a second portion to be attached to the strip member, said second portion being rotatably connected to the first portion around an axis line along the groove,
   a holding device disposed between the first portion and the second portion for holding the second portion in an upright state relative to the first portion, said holding device including a shaft disposed on one of the first and second portions, a shaft receiving hole disposed on the other of the first and second portions for receiving the shaft, and a stopper projection, and
   an engagement device with a ratchet function disposed between the first portion and the second portion for fixing the second portion relative to the first portion in an inclined state, said engagement device including a hook formed on the first portion adjacent to the shaft, and a ratchet tooth formed on the second portion adjacent to the shaft receiving hole so that when the second portion is rotated relative to the first portion, the ratchet tooth engages the hook to hold the second portion in the inclined state,
   wherein the ratchet tooth is formed on one side of the second portion and is arranged relative to the hook such that when the second portion held in the upright state is rotated to the inclined state, the ratchet tooth passes over the hook and is held in the inclined state by engagement with the hook, and
   said stopper projection is formed on said one side of the second portion to be spaced from the ratchet tooth, said stopper projection engaging the hook to hold the second portion in the upright state.

6. A clip for attaching a strip member to a groove, comprising:
   a first portion to be attached to the groove,
   a second portion to be attached to the strip member, said second portion being rotatably connected to the first portion around an axis line along the groove, and having a stopper projection,
   a holding device disposed between the first portion and the second portion for holding the second portion in an upright state relative to the first portion, and
   an engagement device with a ratchet function disposed between the first portion and the second portion for fixing the second portion relative to the first portion in an inclined state, said engagement device having a hook formed on the first portion to engage the stopper projection so that the second portion is held in the upright state, and a ratchet tooth formed on the second portion so that when the second portion is rotated relative to the first portion, the ratchet tooth engages the hook to hold the second portion in the inclined state.
   a second portion to be attached to the strip member, said second portion being rotatably connected to the first portion around an axis line along the groove, and
   a holding device disposed between the first portion and the second portion for holding the second portion in an upright state relative to the first portion.

7. A clip for attaching a strip member according to claim 6, wherein the ratchet tooth is formed on one side of the second portion and is arranged relative to the hook such that when the second portion held in the upright state is rotated to the inclined state, the ratchet tooth passes over the hook and is held in the inclined state by engagement with the hook.

8. A clip for attaching a strip member according to claim 7, wherein said hook is located between the stopper projection and the ratchet tooth in the upright state.

9. A clip for attaching a strip member to a groove, comprising:
   a first portion to be attached to the groove, and having an engagement hole for engaging a stud formed on the groove, and an elastic member at a bottom thereof so that when the engagement hole engages the stud, the elastic member abuts against the groove to stably hold the first portion,
   a second portion to be attached to the strip member, said second portion being rotatably connected to the first portionaround an axis line along the groove, and
   a holding device disposed between the first portion and thesecond portion for holding the second portion in an upright state relative to the first portion.

* * * * *